United States Patent
Hess (10) Patent No.: US 9,994,152 B1
(45) Date of Patent: Jun. 12, 2018

(54) ACTIVE SCANNING COLLISION AVOIDANCE SYSTEM

(71) Applicant: Ryan Hess, Oviedo, FL (US)

(72) Inventor: Ryan Hess, Oviedo, FL (US)

(*) Notice: Subject to any disclaimer, the term of this patent is extended or adjusted under 35 U.S.C. 154(b) by 0 days. days.

(21) Appl. No.: 15/230,789

(22) Filed: Aug. 8, 2016

Related U.S. Application Data (60) Provisional application No. 62/202,543, filed on Aug. 7, 2015.

(51) Int. Cl.
*B60Q 1/00* (2006.01)
*B60Q 9/00* (2006.01)

(52) U.S. Cl.
CPC .................. *B60Q 9/008* (2013.01)

(58) Field of Classification Search
CPC .............. B60R 11/04; B60R 2011/0026
USPC ............................................. 340/435
See application file for complete search history.

(56) References Cited

U.S. PATENT DOCUMENTS

| | | | |
|---|---|---|---|
| 5,768,131 A * | 6/1998 | Lissel ............... | G01S 7/038 180/169 |
| 6,208,876 B1 * | 3/2001 | Raussi ............... | H04M 1/67 455/550.1 |
| 6,674,392 B1 | 1/2004 | Schmidt | |
| 7,474,259 B2 * | 1/2009 | Manor ............... | G01S 7/35 340/905 |
| 8,432,309 B2 | 4/2013 | MacDonald | |
| 8,791,854 B2 | 7/2014 | Forstner | |
| 2002/0139347 A1 * | 10/2002 | Chang ............... | B62K 11/14 123/399 |
| 2005/0001490 A1 * | 1/2005 | Weiler ............... | H01J 37/32082 307/151 |
| 2008/0040004 A1 * | 2/2008 | Breed ............... | B60R 21/0134 701/45 |
| 2009/0122430 A1 * | 5/2009 | DeWard .............. | B60R 11/04 359/871 |
| 2011/0221628 A1 * | 9/2011 | Kamo ............... | G01S 7/295 342/70 |
| 2012/0296567 A1 * | 11/2012 | Breed ............... | G01C 21/26 701/468 |
| 2013/0021146 A1 * | 1/2013 | Stegmaier .......... | G08G 1/162 340/436 |
| 2014/0253364 A1 | 9/2014 | Lee | |
| 2014/0316261 A1 * | 10/2014 | Lux ................. | A61B 5/0022 600/430 |

FOREIGN PATENT DOCUMENTS

EP          1684092          7/2006

* cited by examiner

*Primary Examiner* — Fabricio R Murillo Garcia
(74) *Attorney, Agent, or Firm* — Larry D. Johnson (57) ABSTRACT

An active scanning collision avoidance system for vehicles and the like. In one embodiment, an active scanning radar module is affixed to a vehicle's roof. A microwave transmitter sends out a signal to a directional antenna or array directed outwards radially away from the radar assembly. When this transmitted signal is reflected off another vehicle or object, it is received by a second directional antenna or array. This return signal is mixed internally with the transmitted signal, and the resulting signal is amplified and processed so that distance, velocity and object size can be determined. These object attributes are transmitted to an in-vehicle display in real time for quick and informed decision-making for the driver.

12 Claims, 8 Drawing Sheets

ACTIVE SCANNING COLLISION AVOIDANCE SYSTEM

CROSS REFERENCE TO RELATED APPLICATIONS

The present application claims the benefit of the filing date of U.S. Provisional Patent Application Ser. No. 62/202,543, filed Aug. 7, 2015. The foregoing application is incorporated by reference in its entirety as if fully set forth herein.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to systems and methods of determining and displaying distances to objects and spatial orientation in a motorized vehicle, and more particularly to an improved active scanning collision avoidance system.

BACKGROUND INFORMATION AND DISCUSSION OF RELATED ART

Originally, motor vehicles did not have any form of collision avoidance other than driver or occupant spatial awareness. With an increasing number of driver distractions, including cellular telephones, navigational systems, radios, and others, there is an increasing difficulty experienced by the driver to remain focused on driving. In many instances, it may be impossible for the driver to simultaneously track multiple vehicles in multiple lanes. Vehicles are not always going to maintain speed; they may accelerate, decelerate, or change lanes without warning.

U.S. Pat. No. 8,432,309 describes an automotive radar system and method for using the same. Other known references include U.S. Pub. No. 20140253364, U.S. Pat. No. 6,674,392, U.S. Pat. No. 8,791,854, and European Patent No. EP1684092.

The foregoing patents and published applications reflect the current state of the art of which the present inventor is aware. Reference to, and discussion of, these patents and applications is intended to aid in discharging Applicant's acknowledged duty of candor in disclosing information that may be relevant to the examination of claims to the present invention. However, it is respectfully submitted that none of the above-indicated patents or applications disclose, teach, suggest, show, or otherwise render obvious, either singly or when considered in combination, the invention described and claimed herein.

SUMMARY OF THE INVENTION

The present invention provides an improved active scanning collision avoidance system. In one embodiment of the present invention, an active scanning radar module is affixed to a vehicle's roof by some method. This radar module includes a weatherproof radome, microwave antenna apparatus, microwave transmitter and receiver, microcontroller or field programmable gate array (FPGA) or other digital signal processor (DSP) and associated control circuitry on a circuit board, and optionally a mechanical steering mechanism.

During operation, the radar assembly may rotate inside the protective cover of the radome. The rotational speed is governed by a microcontroller on a circuit board. This microcontroller determines rotational speed by optical encoder, or another method, and adjusts power delivered to the motor. This motor rotates the radar assembly directly or indirectly as through pulleys, gears, or wheels.

An alternative embodiment of the present invention requires a plurality of antennas and an ability to switch between the antennas to control directionality of the microwave radiation pattern, or a plurality of antennas and microwave transmitters. This would mimic a rotational radiation pattern without physical rotation of the device.

As the radar assembly rotates, a microwave transmitter sends out a Frequency Modulated Continuous Wave (FMCW) microwave signal. This signal is delivered to a directional antenna or antenna array and directed outwards radially away from the radar assembly.

When this transmitted microwave signal is reflected off another vehicle or object, it is received by a second directional antenna or antenna array on the radar assembly. This return signal is mixed internally with the transmitted signal, and the resulting signal is amplified and processed by a microcontroller or field programmable gate array (FPGA) or other digital signal processor (DSP), and distance, velocity and object size can be determined.

These object attributes are transmitted to an in-vehicle display. This display may be an LCD monitor, LED indicator, heads up display (HUD), alarm, or projection system. The display may show the distance, size, and velocity of the object relative to the driver, or provide other audible or visual indication to any one of these attributes.

As the radar assembly rotates (mechanically, or electrically, as in the case of switched antennas), the objects around the vehicle can be presented in real time for quick and informed decision-making for the driver.

It is therefore an object of the present invention to provide a new and improved collision avoidance system.

It is another object of the present invention to provide a new and improved collision avoidance system that can be readily installed on a vehicle.

A further object or feature of the present invention is a new and improved collision avoidance system that can display the distance, size, and velocity of an object relative to the driver.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Referring to FIGS. 1 through 8, wherein like reference numerals refer to like components in the various views, there is illustrated therein a new and improved active scanning collision avoidance system.

Figure 1:
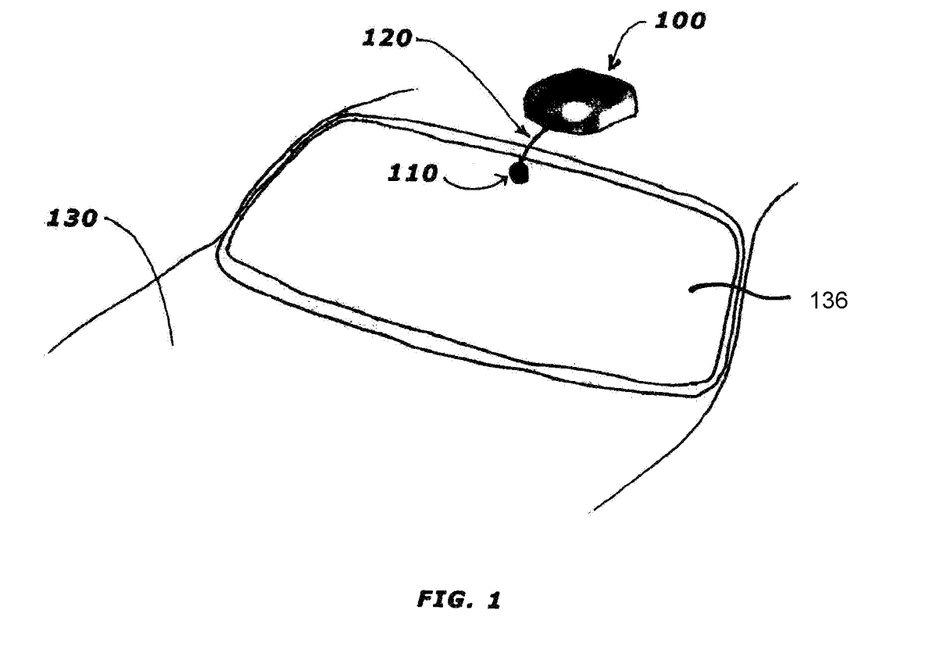
FIG. 1 is a perspective view of one embodiment of the radar apparatus of the present invention attached to the roof of a vehicle.

FIG. 1 is a perspective view of one embodiment of the present invention of the radar apparatus 100 attached to the roof of vehicle 130. A power cord 120 connects the radar apparatus 100 to an inductive power receiver 110. This inductive power receiver mounts to windshield 136 by adhesive, magnetic or other means.

Figure 5:
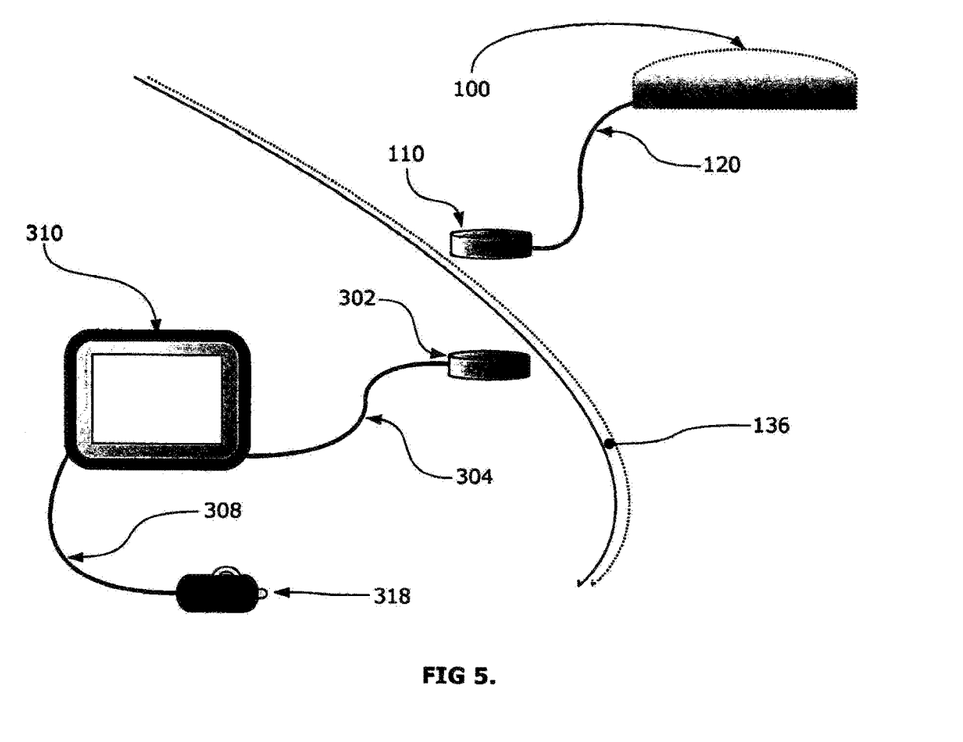
FIG. 5 is a block diagram of the power components of the radar apparatus of one embodiment of the present invention.

FIG. 5 shows a block diagram of the power components of one embodiment of the present invention. Power for the radar apparatus is received through cigarette lighter or power port connector 318 or hardwired into the vehicle's electrical system. Connector 318 is connected to the LCD visual display 310 by power cord 308. Power for the LCD visual display 310 is received from the vehicle in this way. As well, power is routed through power cord 304 to inductive power transmitter 302. Inductive power transmitter 302 uses a high frequency driven air coil to effectively transmit power through the vehicle's windshield 136 to the internal coil of the inductive power receiver 110. Inductive power receiver 110 receives electrical power through the windshield 136, and sends the power through power cord 120 to the radar apparatus 100.

Figure 3:
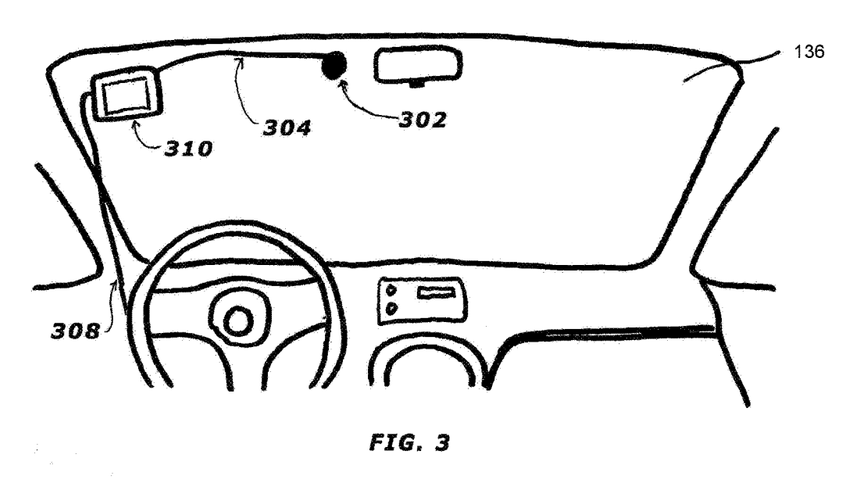
FIG. 3 is a perspective view of a vehicle interior in accordance with one embodiment of the present invention.

FIG. 3 shows a perspective view of a vehicle interior in accordance with one embodiment of the present invention. It shows possible mounting locations of the power cord 308, the LCD visual display 310, and the power cord 304 to the inductive power transmitter 302. The inductive power transmitter 302 mounts to windshield 136 by adhesive, magnetic, or other means. This arrangement of inductive power transfer through the windshield enables a user to install the system on a vehicle in seconds, without drilling holes in the vehicle and running cabling and wires.

Figure 2:
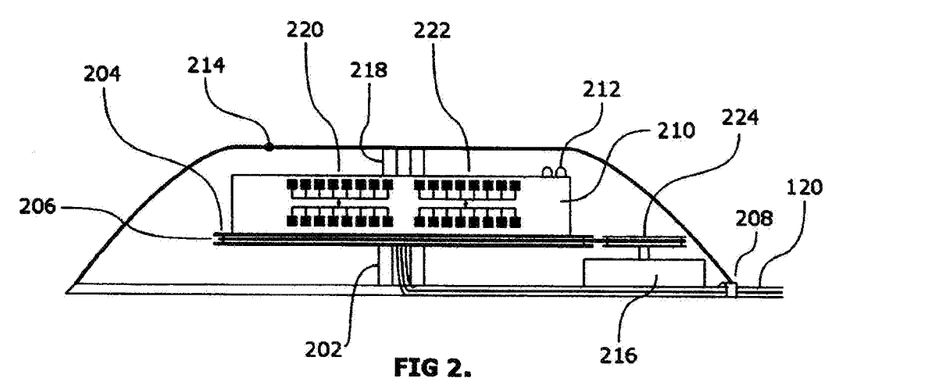
FIGS. 2 and 2A are cross-section plan views of one embodiment of the radar apparatus of the present invention.
Figure 2A:
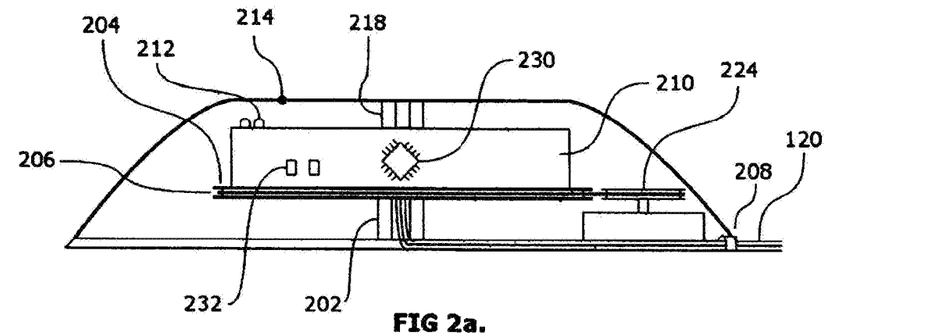

FIGS. 2 and 2A are cross-section plan views of one embodiment of the radar apparatus of the present invention. A protective radome 214 protects the entire radar apparatus from weather and water intrusion. Inside, motor 216 drives pulley 224, which moves drive belt 206 and rotates pulley assembly 204. Power to the motor 216 and radar printed circuit board (PCB) 210 comes from power cord 120, through strain relief 208, and through bearing and electrical slip ring assembly 202. Bearing 218 supports the rotating pulley assembly 204 from the top side of the radome 214. A reflective pattern on the inside top underside of radome 214 reflects infrared light from LED and photodiode assembly 212. As the PCB assembly 210 rotates within the radome housing 214, the LED and photodiode assembly 212 pick-up reflections from a black and white repeating pattern inside radome housing 214. These electrical pulses from are converted into a rotational speed and orientation (in degrees) by a timer and frequency counter within microcontroller 230. The starting orientation is determined based on passing a white "key pattern" at zero degrees. The current orientation can then be determined by counting the number of pulses past zero degrees, like an optical encoder. Microcontroller 230 governs the speed of the rotating assembly by a Proportional Integral Derivative feedback control loop and controls the motor 216 directly by controlling the current delivered by pulse width modulation.

Figure 6:
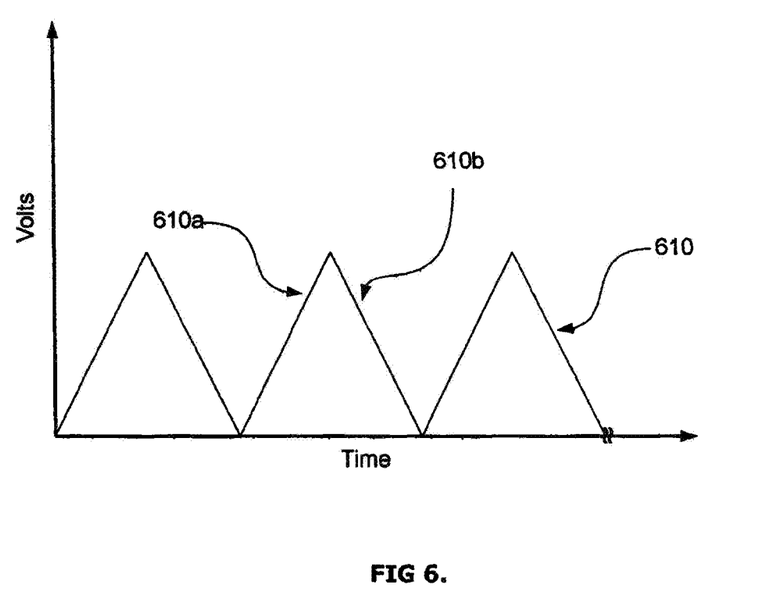
FIG. 6 is a graph showing a signal generated by the microcontroller.

FIG. 6 is a graph showing a signal generated by the microcontroller. As the assembly rotates, the Digital to Analog Converter of microcontroller 230 generates a triangle waveform 610 having a rising edge 610a and falling edge 610b.

Figure 4:
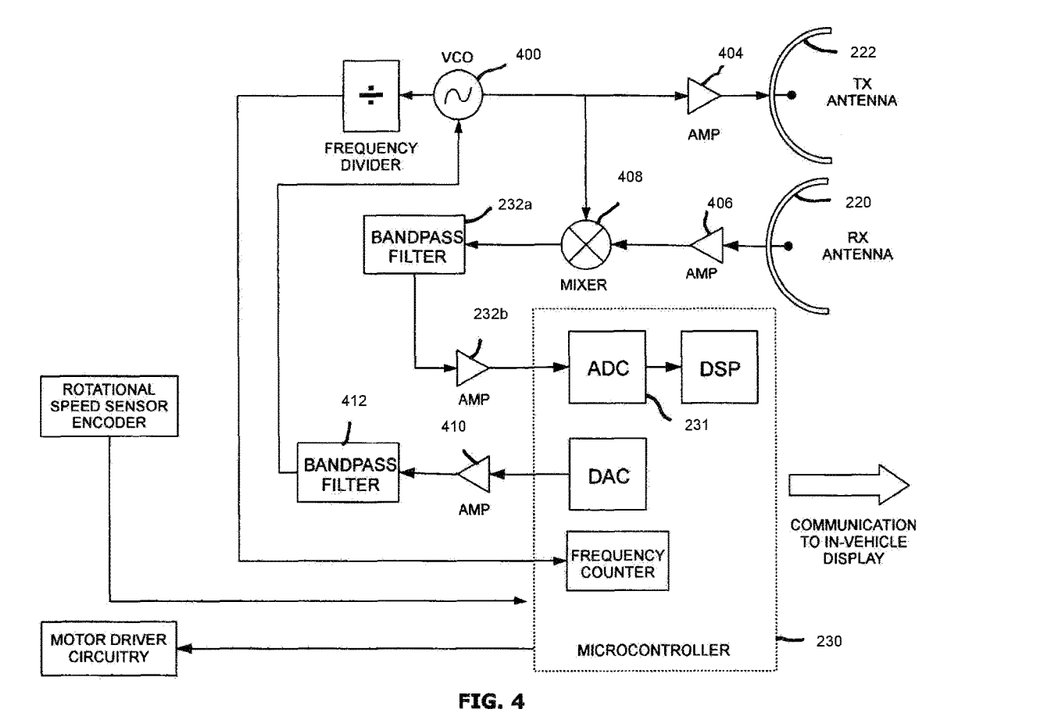
FIG. 4 is a block diagram of the electronic components of the radar apparatus of one embodiment of the present invention.

FIG. 4 is a block diagram of the electronic components of the radar apparatus of one embodiment of the present invention. The triangle waveform (FIG. 6) passes through an amplifier 410 and an active bandpass filter 412 to eliminate harmonics. It is then passed to Voltage Controlled Oscillator 400. The Voltage Controlled Oscillator 400 generates a microwave signal of a frequency proportional to the voltage received. This microwave signal is delivered to a radio frequency amplifier 404 and transmitted through the transmit antenna 222. A portion of the microwave signal from the Voltage Controlled Oscillator 400 is split to a mixer 408 and forms a superheterodyne receiver.

An object in front of a vehicle ("Target") will reflect a portion of the transmitted microwaves and be picked up by receive antenna 220. This signal is amplified by radio frequency amplifier 406 and delivered to mixer 408 which mixes the signal with a portion of the transmit signal and the difference of the signal is filtered out and amplified by bandpass filter 232a and amplifier 232b.

This signal is delivered to the analog to digital converter 231 of the microcontroller 230 to be sampled. Internal to the microcontroller 230, an interrupt is generated every time the triangle wave 610 changes direction; that is, on every rising edge 610a and on every falling edge 610b (FIG. 6). As such, the microcontroller 230 knows whether the frequency generated by the Voltage Controlled Oscillator 400 is rising or falling. This is important, because the results from the ADC 231 fall into two different arrays as seen in FIG. 7.

Figure 7:
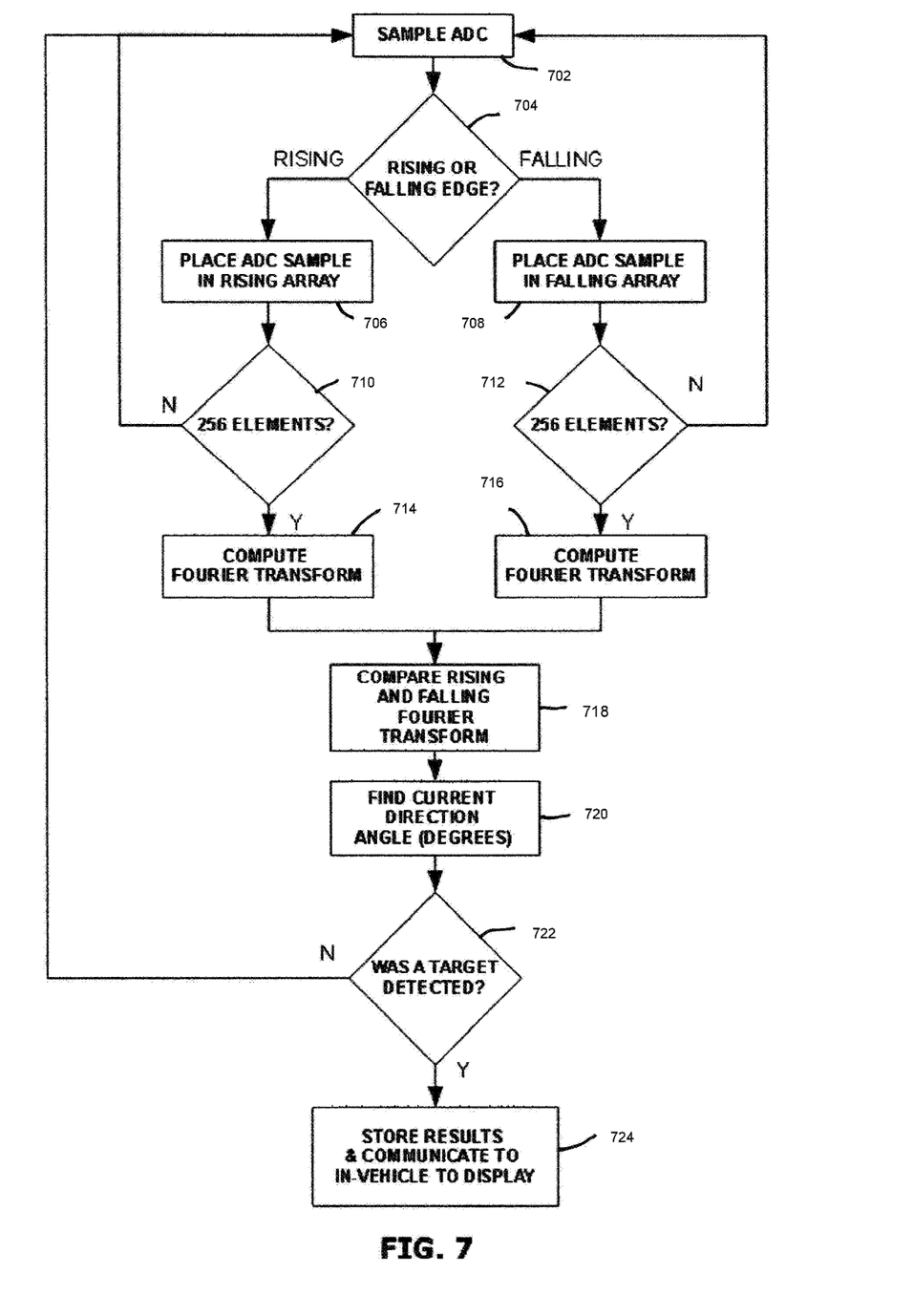
FIG. 7 is a schematic diagram showing operative logic of one embodiment of the present invention.

FIG. 7 is a schematic diagram showing operative logic of one embodiment of the present invention, including Sample ADC 702; Rising or Falling Edge 704; Place ADC Sample in Rising Array 706/Falling Array 708; 256 Elements? 710, 712; Compute Fourier Transform 714, 716; Compare Rising and Falling Fourier Transform 718; Find Current Direction Angle (Degrees) 720; Was a Target Detected 722; and Store Results and Communicate to In-Vehicle Display 724.

Figure 8:
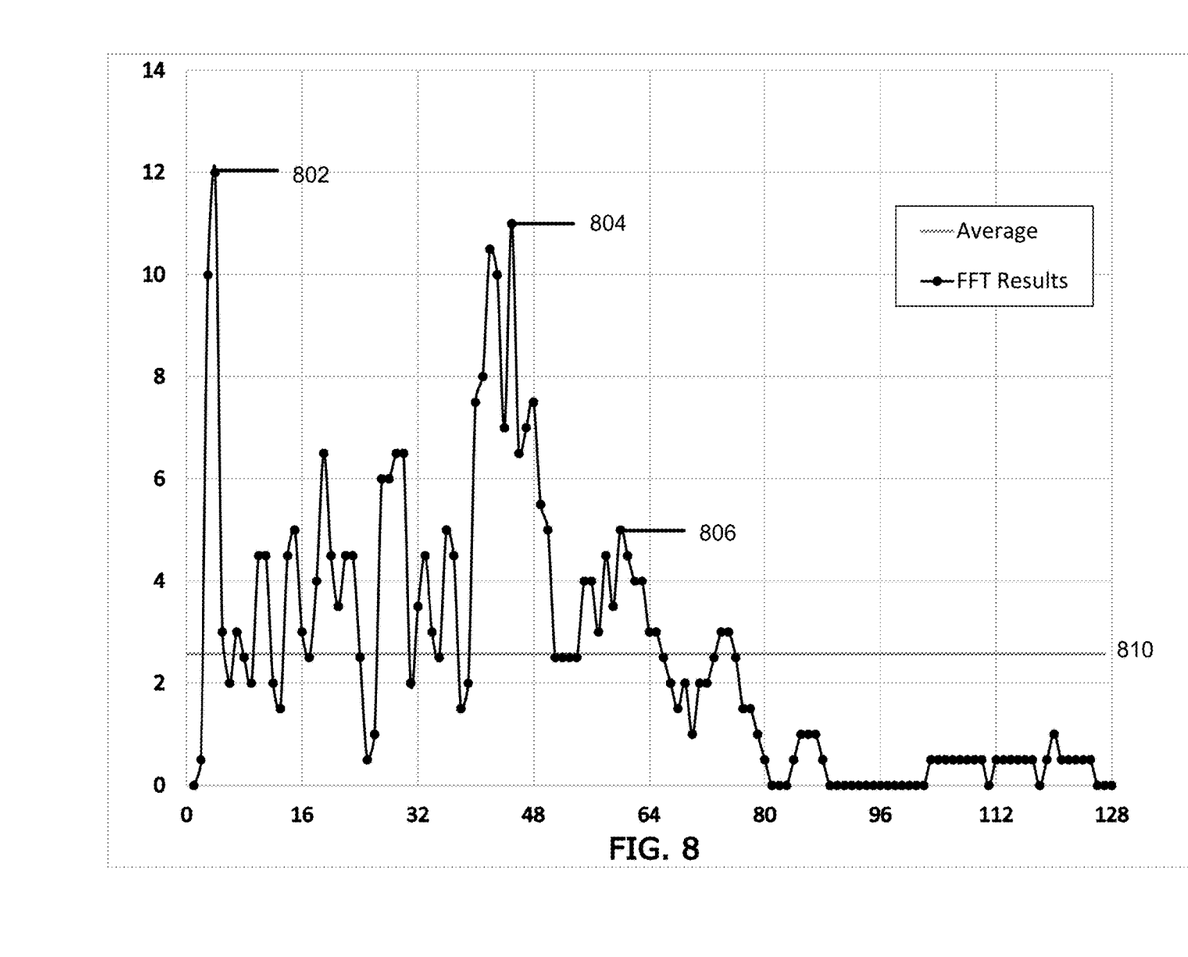
FIG. 8 is a graph showing the results of one Fourier Transformation of the received reflected signal with multiple "Targets".

FIG. 8 is a graph showing the results of a typical Fourier Fast Transformation of the received reflected signal with multiple "Targets". Target detection is based on the current average background noise 810 and whether the peaks 804 and 806 are significantly above the average 810. The first elements 0 through 5 (e.g. 802 in FIG. 8) of the Fourier Fast Transform are generally ignored as they are related to DC offsets or otherwise targets too close to the transmitter to be real. One example of a target too close to be real would be the radome housing 214 itself.

Each array is compared based on the current rotational position in degrees. A single Target may have different peaks in both the rising and falling arrays. Specifically, this means the Target has a velocity relative to the vehicle, and the velocity can be calculated based on the Doppler frequency: [Fd=(Rising Array Frequency−Falling Array Frequency)/2.]. As such, both target orientation (in degrees), size (in terms of peak magnitude), and velocity can be transmitted to the in-vehicle display.

The apparatus may use the ISM band of 24.00 to 24.25 Ghz, 61.0 Ghz, or any other usable frequency.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. An active scanning collision avoidance system for vehicles, said system comprising:
    an active scanning radar module housed in a weatherproof radome adapted to be affixed to a vehicle's roof;
    transmitter means in the radar module to transmit a microwave radar signal directed outwards radially away from said radar module;
    receiver means in the radar module to receive a reflected return signal when at least a portion of the transmitted microwave radar signal is reflected off another vehicle or object;
    processing means to process the transmitted microwave radar signal and the received reflected return signal so that the distance, velocity and object size of the other vehicle or object can be determined, by applying Fast Fourier Transformation (FFT) to the received return signal; wherein peaks of the FFT applied received return signal are significantly above an average background noise of the received reflected return signal; and
    in-vehicle display means to display the distance, velocity and object size of the other vehicle or object in real time to a vehicle occupant.

2. The active scanning collision avoidance system of claim 1 wherein power is routed through a power cord to an inductive power transmitter to transmit power through the vehicle's windshield to an internal coil of an inductive power receiver, and sends the power through a power cord to the radar module, enabling a user to install the system on a vehicle without drilling holes in the vehicle and running cabling and wires.

3. The active scanning collision avoidance system of claim 2 wherein the inductive power transmitter comprises a high frequency driven air coil.

4. The active scanning collision avoidance system of claim 1 wherein the radar module comprises a rotary printed circuit board array.

5. The active scanning collision avoidance system of claim 1 wherein the radar module comprises a light emitting diode and photodiode assembly.

6. The active scanning collision avoidance system of claim 5 wherein the radar module comprises a microcontroller to convert electrical pulses received from the light emitting diode and photodiode assembly to a determination of rotational speed and orientation.

7. The active scanning collision avoidance system of claim 6 wherein the microcontroller includes a digital to analog converter to generate a triangle waveform.

8. The active scanning collision avoidance system of claim 7 wherein the radar module comprises a voltage controlled oscillator to generate the microwave radar signal of a frequency proportional to a voltage received from the digital to analog converter.

9. The active scanning collision avoidance system of claim 8 wherein the transmitter means comprises a transmit antenna, and the microwave signal from the voltage controlled oscillator is delivered to a radio frequency amplifier and transmitted by the transmit antenna.

10. The active scanning collision avoidance system of claim 9 wherein the receiving means comprises a receive antenna to receive the reflected return signal.

11. The active scanning collision avoidance system of claim 10 wherein the radar module includes a mixer to mix the reflected return signal with a portion of the microwave signal from the voltage controlled oscillator.

12. The active scanning collision avoidance system of claim 11 wherein the mixer delivers a filtered signal to an analog to digital converter to be sampled.

* * * * *